US009584781B2

(12) United States Patent
Deng

(10) Patent No.: US 9,584,781 B2
(45) Date of Patent: Feb. 28, 2017

(54) IMAGE DISPLAYING METHOD AND ELECTRONIC DEVICE

(71) Applicant: LENOVO (BEIJING) LIMITED, Beijing (CN)

(72) Inventor: Yuanyuan Deng, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 15/209,253

(22) Filed: Jul. 13, 2016

(65) Prior Publication Data

US 2016/0323551 A1 Nov. 3, 2016

Related U.S. Application Data

(63) Continuation of application No. 14/228,990, filed on Mar. 28, 2014, now Pat. No. 9,407,888.

(30) Foreign Application Priority Data

Sep. 27, 2013 (CN) .......................... 2013 1 0453013

(51) Int. Cl.

| | |
|---|---|
| ***H04N 5/74*** | (2006.01) |
| ***H04N 9/31*** | (2006.01) |
| ***A63F 13/25*** | (2014.01) |
| ***A63F 13/803*** | (2014.01) |

(52) U.S. Cl.
CPC ........... *H04N 9/3173* (2013.01); *A63F 13/25* (2014.09); *A63F 13/803* (2014.09); *H04N 9/3185* (2013.01)

(58) Field of Classification Search
USPC .................................................. 348/744, 745
See application file for complete search history.

(56) References Cited

U.S. PATENT DOCUMENTS

| | | | | |
|---|---|---|---|---|
| 8,246,172 B2 * | 8/2012 | Amano | H04N 9/3185 | 348/745 |
| 8,823,727 B2 * | 9/2014 | Yamaguchi | G03B 21/14 | 345/3.1 |
| 9,407,888 B2 * | 8/2016 | Deng | H04N 9/3173 | |
| 2009/0027571 A1 * | 1/2009 | Amano | H04N 9/3185 | 348/744 |
| 2009/0033785 A1 * | 2/2009 | Fujinawa | G03B 21/00 | 348/333.01 |
| 2011/0111849 A1 * | 5/2011 | Sprague | G03B 21/14 | 463/31 |

(Continued)

*Primary Examiner* — Paulos M Natnael
(74) *Attorney, Agent, or Firm* — Scully Scott Murphy & Presser

(57) ABSTRACT

The present disclosure proposes an image displaying method applied in an electronic device. The electronic device comprises a display unit and a projection unit. The display unit is placed on a first surface of the electronic device. The method comprises: determining data to be displayed when the projection unit is placed on a second surface of the electronic device opposite to the first surface; projecting, by the projection unit, the data to be displayed onto a carrier to present a first display image on the carrier, the first display image corresponds to a first part of the data to be displayed; displaying, by the display unit, a second part of the data to be displayed to display a second display image corresponding to the second part on the display unit. The present disclosure further proposes an electronic device.

8 Claims, 10 Drawing Sheets

(56) References Cited

U.S. PATENT DOCUMENTS

| | | | | |
|---|---|---|---|---|
| 2012/0057061 | A1* | 3/2012 | Osaka | G03B 17/54 348/333.1 |
| 2012/0212647 | A1* | 8/2012 | Ueno | G03B 17/54 348/231.99 |
| 2012/0214546 | A1* | 8/2012 | Osaka | H04M 1/0272 455/556.1 |
| 2013/0063646 | A1* | 3/2013 | Ueno | G03B 21/142 348/333.1 |
| 2013/0222369 | A1* | 8/2013 | Huston | G06T 17/00 345/419 |

* cited by examiner

IMAGE DISPLAYING METHOD AND ELECTRONIC DEVICE

CROSS-REFERENCE TO RELATED APPLICATION

This application is a continuation of U.S. application Ser. No. 14/228,990 filed on Mar. 28, 2014, which is based upon and claims priority to Chinese Patent Application No. 201310453013.X, filed Sep. 27, 2013, the entire contents of which are incorporated herein by reference.

TECHNICAL FIELD

The present disclosure relates to the field of electronics technology, and in particular, to an image displaying method and an electronic device.

BACKGROUND

With the development of technology, many electronic devices have been come in people's life with great facility. A mobile phone has powerful functionalities, such as placing calls, sending messages, playing games, surfing on the Internet, investing in stocks, etc.

Typically, the existing mobile phone is provided with a display screen for presenting text and image information to the user.

However, the display screen provided on the existing mobile phone is usually very small. In view of this, there is a technical problem that data to be displayed cannot be clearly displayed, thereby easily resulting in visual fatigue for the user watching a small-size screen for long time.

SUMMARY

Embodiments of the present disclosure provide an image displaying method and an electronic device, which can solve the problem for the existing mobile phone provided with a small screen that data to be displayed cannot be clearly displayed, thereby easily resulting in visual fatigue for the user watching a small-size screen for long time.

A first aspect of the present disclosure provides an image displaying method applied in an electronic device. The electronic device comprises a display unit and a projection unit having a projection area. The display unit is placed on a first surface of the electronic device. The method comprises:

- determining data to be displayed when the projection unit is placed on a second surface of the electronic device opposite to the first surface;
- projecting, by the projection unit, the data to be displayed onto a carrier to present a first display image on the carrier, wherein the carrier is placed in the projection area and the first display image at least corresponds to a first part of the data to be displayed;
- displaying, by the display unit, a second part of the data to be displayed to display a second display image corresponding to the second part on the display unit in such a manner that when an observer located at the display unit side observes the first and second display images, the second display image is a part of the first display image, which is shielded by the electronic device;
- wherein a first distance between the carrier and the projection unit is larger than or equal to a preset distance, so that a carrying area on the carrier for carrying the first display image is larger than a display area of the display unit.

Preferably, said projecting, by the projection unit, the data to be displayed on the carrier to present the first display image on the carrier comprises:

- projecting, by the projection unit, the data to be displayed onto the carrier in a first projection direction;
- determining the carrying area on the carrier for carrying the first display image as a first carrying area, wherein the first carrying area is a fixed area on the carrier;
- detecting whether there is a translation movement for the electronic device relative to the carrier;
- obtaining a translation vector of the translation movement when detecting the translation movement;
- determining a second projection direction based on the translation vector, wherein the second projection direction is a projection direction that allows the electronic device to, after the translation movement, project the data to be displayed onto the first carrying area; and
- projecting, by the projection unit, the data to be displayed onto the first carrying area in the second projection direction, so as to keep the first display image be presented on the first carrying area.

Preferably, said projecting, by the projection unit, the data to be displayed onto the carrier to present the first display image on the carrier comprises:

- obtaining a current included angle between a preset edge of the display unit and the horizontal direction;
- judging whether the current included angle is 0 degree;
- when the current included angle is 0 degree, directly projecting the data to be displayed onto the carrier to present the horizontally displayed first display image on the carrier;
- when the current included angle is not 0 degree, determining an adjustment angle based on the current included angle;
- adjusting the data to be displayed based on the adjustment angle; and
- projecting the adjusted data to be displayed onto the carrier, so as to present the horizontally displayed first display image on the carrier.

Preferably, the projection unit comprises:

- a case in a sealed state, inside which an accommodation cavity is formed, a preset dose of liquid being held in the accommodation cavity and a transmittance of a first face of the case meeting a preset condition;
- a projection module placed in the accommodation cavity and floating on the liquid, the projection module being capable of projecting the data to be displayed onto the carrier though the first face of the case;
- wherein the current included angle between the preset edge of the display unit and the horizontal direction is 0 degree, the projection unit is capable of presenting the horizontally displayed first display image on the carrier; when the current included angle is not 0 degree, the projection unit is still capable of presenting the horizontally displayed first display image on the carrier.

Preferably, said projecting, by the projection unit, the data to be displayed onto the carrier to present the first display image on the carrier comprises:

- obtaining a first distance value of the first distance and a first preset size of the first display image at a first moment;
- determining a current projection angle of the projection unit as a first projection angle based on the first distance value and the first preset size;

projecting, by the projection unit, the data to be displayed onto the carrier in the first projection angle in such a manner that a size of the first display image presented on the carrier is the first preset size;

obtaining a second distance value of the first distance at a second moment after the first moment, the second distance value being different from the first distance value;

determining the current projection angle as a second projection angle based on the second distance value and the first preset size; and projecting, by the projection unit, the data to be displayed onto the carrier in the second projection angle in such a manner that a size of the first display image presented on the carrier is kept as the first preset size.

Preferably, said displaying, by the display unit, the second part of the data to be displayed comprises:

determining, by an image collecting unit placed on the second surface, the second display image from the first display image presented on the carrier; and displaying the second display image by the display unit.

A second aspect of the present disclosure provides an electronic device, comprising:

a display unit placed on a first surface of the electronic device;

a projection unit placed on a second surface of the electronic device and having a projection area, the first surface being opposite to the second surface;

a processor connected to the display unit and the projection unit, the processor being configured to:

determine data to be displayed when the projection unit is placed on a second surface of the electronic device opposite to the first surface;

project, by the projection unit, the data to be displayed onto a carrier to present a first display image on the carrier, wherein the carrier is placed in the projection area and the first display image at least corresponds to a first part of the data to be displayed;

displaying, by the display unit, a second part of the data to be displayed to display a second display image corresponding to the second part on the display unit in such a manner that when an observer located at the display unit side observes the first and second display images, the second display image is a part of the first display image, which is shielded by the electronic device;

wherein a first distance between the carrier and the projection unit is larger than or equal to a preset distance, so that a carrying area on the carrier for carrying the first display image is larger than a display area of the display unit.

Preferably, said processor is further configured to:

project, by the projection unit, the data to be displayed onto the carrier in a first projection direction;

determine the carrying area on the carrier for carrying the first display image as a first carrying area, wherein the first carrying area is a fixed area on the carrier;

detect whether there is a translation movement for the electronic device relative to the carrier;

obtain a translation vector of the translation movement when detecting the translation movement;

determine a second projection direction based on the translation vector, wherein the second projection direction is a projection direction that allows the electronic device to, after the translation movement, project the data to be displayed onto the first carrying area; and project, by the projection unit, the data to be displayed onto the first carrying area in the second projection direction, so as to keep the first display image be presented on the first carrying area.

Preferably, said processor is further configured to:

obtain a current included angle between a preset edge of the display unit and the horizontal direction;

judge whether the current included angle is 0 degree;

when the current included angle is 0 degree, directly control the projection unit to project the data to be displayed onto the carrier to present the horizontally displayed first display image on the carrier;

when the current included angle is not 0 degree, determine an adjustment angle based on the current included angle;

adjust the data to be displayed based on the adjustment angle; and project the adjusted data to be displayed onto the carrier, so as to present the horizontally displayed first display image on the carrier.

Preferably, the projection unit comprises:

a case in a sealed state, inside which an accommodation cavity is formed, a preset dose of liquid being held in the accommodation cavity and a transmittance of a first face of the case meeting a preset condition;

a projection module placed in the accommodation cavity and floating on the liquid, the projection module being capable of projecting the data to be displayed onto the carrier though the first face of the case;

wherein the current included angle between the preset edge of the display unit and the horizontal direction is 0 degree, the projection unit is capable of presenting the horizontally displayed first display image on the carrier; when the current included angle is not 0 degree, the projection unit is still capable of presenting the horizontally displayed first display image on the carrier.

Preferably, said processor is further configured to:

obtain a first distance value of the first distance and a first preset size of the first display image at a first moment;

determine a current projection angle of the projection unit as a first projection angle based on the first distance value and the first preset size;

project, by the projection unit, the data to be displayed onto the carrier in the first projection angle in such a manner that a size of the first display image presented on the carrier is the first preset size;

obtain a second distance value of the first distance at a second moment after the first moment, the second distance value being different from the first distance value;

determine the current projection angle as a second projection angle based on the second distance value and the first preset size; and project, by the projection unit, the data to be displayed onto the carrier in the second projection angle in such a manner that a size of the first display image presented on the carrier is kept as the first preset size.

Preferably, said electronic device further comprises an image collecting device placed on the second surface and connected to the processor. In this case, the processor is further configured to: determine, by the image collecting device, the second display image from the first display image presented on the carrier; and display the second display image by the display unit.

One or more technical solutions according to embodiments of the present disclosure have at least technical effects as follows.

1. The embodiments of the present disclosure may use the projection unit to project data to be displayed onto the carrier, such as a wall or a projection curtain. Moreover, the carrying area on the carrier for displaying the first display image is larger than the display area of the display unit. This may obtain on the carrier a large-size display image for the data to be displayed, thereby solving the technical problem of the existing mobile phone that the data to be displayed cannot be clearly displayed, thereby easily resulting in visual fatigue for the user watching a small-size screen for long time. Then, the user may see an enlarged image of the data to be displayed on the carrier.

2. The use of the projection unit may enable the mobile phone to share the data to be displayed on the carrier, such as a wall or a projection curtain, for more users to watch the data to be displayed.

3. According to the embodiments of the present disclosure, the display unit of the electronic device is used to display the second display image. The second display image is a part of the first display image, which is shielded by the electronic device when the user watches over the electronic device the first display image projected onto the carrier. Thereby, the user may obtain more realistic game experiences and visual enjoyment. For example, when the user is playing, for example, a racing game as shown in FIG. 6, the second display image may only contain a racing car. At this time, the user may manipulate the game as really driving in the racing car, and obtain the road condition for the racing car and its surroundings from the first display image 401. Thereby, the user may obtain more realistic game experiences and visual enjoyment.

4. According to the embodiments of the present disclosure, when the projection unit performs a projection, if there is a translation movement for the electronic device relative to the carrier, the projection unit may make a corresponding adjustment to keep the first display image be presented on the same carrier area of the carrier. This may present the first display image on the first carrying area of the carrier no matter how the electronic device translates. In this way, when a size of the carrier is small, it is possible to continuously project the first display image onto the first carrying area. Meanwhile, this may further eliminate jitters of the translation movement of the first display image when the electronic device is held in hand, so that the observer watching the first display image can watch the first display image in a stable state without jitters.

5. According to the embodiments of the present disclosure, when the projection unit performs a projection, if the electronic devices swings clockwise or anticlockwise, the electronic device may make a corresponding adjustment to keep the horizontally displayed first display image be presented on the carrier. Thus, this may achieve the technical effect that the first display image projected onto the carrier may always keep in a horizontal situation no matter how the electronic device swings. In this way, when the electronic device is held in hand, this may protect the first display image from rotating clockwise or anticlockwise due to hand shakes. Thereby, this allows the observer to watch the first display image in a clear, stable, and non-shaky manner.

6. According to the embodiments of the present disclosure, a size of the first display image may be freely set. Moreover, the electronic device may adjust a projection angle of a projection unit in real time based on the user setting and depending on a distance between the electronic device and the carrier. This may project from the size of the first display image from changing due to swinging of the electronic device when it is held by the user. Thereby, the present disclosure may achieve a technical effect of keeping the size of the first display image presented on the carrier unchanged.

7. The embodiments of the present disclosure provide a projection unit. The projection unit includes a case and a projector. The case is in a sealed state. An accommodation cavity is formed inside the case. There is a preset dose of liquid held in the accommodation cavity. A transmittance of a first face of the case meets a preset condition. The projector is placed in the accommodation cavity and floats on the liquid. The projector is capable of projecting the data to be displayed onto the carrier though the first face of the case. With such a projection unit, when the current included angle between a preset edge of the display unit and the horizontal direction is 0 degree, the projector can present the horizontally displayed first display image on the carrier. When the current included angle between the preset edge of the display unit and the horizontal direction is not 0 degree, the projector can still present the horizontally displayed first display image on the carrier.

DETAILED DESCRIPTION OF PREFERRED EMBODIMENTS

In order to solve the technical problem for the existing mobile phone provided with a small screen that data to be displayed cannot be clearly displayed, thereby easily resulting in visual fatigue for the user watching a small-size screen for long time, the present disclosure provides an image displaying method and an electronic device.

A technical solution of the present disclosure may be described as an image displaying method applied in an electronic device. The electronic device comprises a display unit and a projection unit having a projection area. The display unit is placed on a first surface of the electronic device. The method comprises:

- determining data to be displayed when the projection unit is placed on a second surface of the electronic device opposite to the first surface;
- projecting, by the projection unit, the data to be displayed onto a carrier to present a first display image on the carrier, wherein the carrier is placed in the projection area and the first display image at least corresponds to a first part of the data to be displayed;
- displaying, by the display unit, a second part of the data to be displayed, to display a second display image corresponding to the second part on the display unit in such a manner that when an observer located at the display unit side observes the first and second display images, the second display image is a part of the first display image, which is shielded by the electronic device;
- wherein a first distance between the carrier and the projection unit is larger than or equal to a preset distance, so that a carrying area on the carrier for carrying the first display image is larger than a display area of the display unit.

Detailed description of technical solutions of the present disclosure will be made through drawings and specific embodiments. It will be appreciated that embodiments of the present disclosure and specific features in the embodiments are detailed descriptions, rather than limitations, of the technical solutions of the present disclosure. The embodiments of the present disclosure and technical features therein may be combined with each other without conflicts.

The term "and/or" in the context only describes an association of associated objects and refers to existence of three relationships. For example, A and/or B may refer to three cases: only A exists; A and B both exist; and only B exists. Moreover, the character "/" in the context generally indicates associated objects before and after it are in a "or" relationship.

First Embodiment

Figure 1:
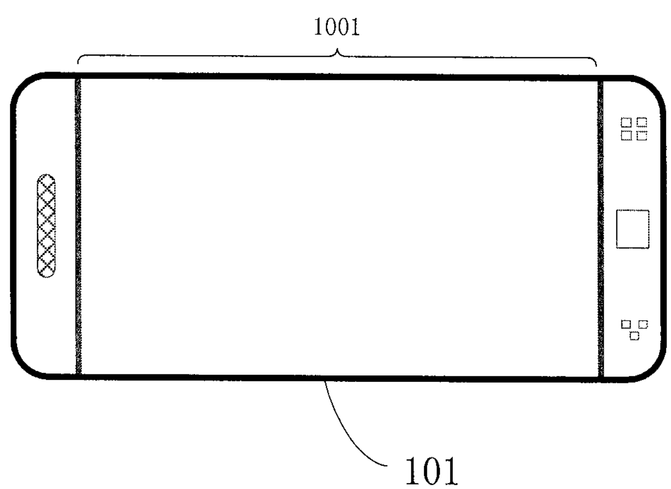
FIG. 1 is a structure diagram of a first surface (i.e., the front) of an electronic device according to an embodiment of the present disclosure.
Figure 2:
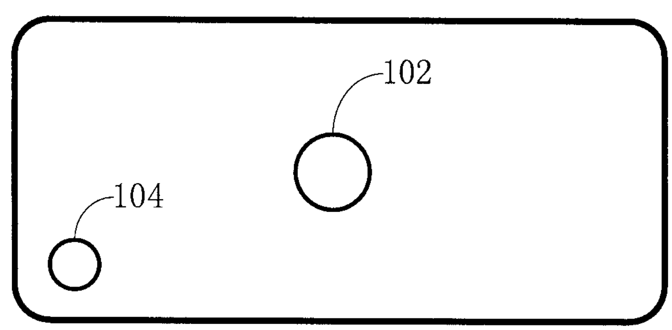
FIG. 2 is a structure diagram of a second surface (i.e., the back) of an electronic device according to an embodiment of the present disclosure.
Figure 3:
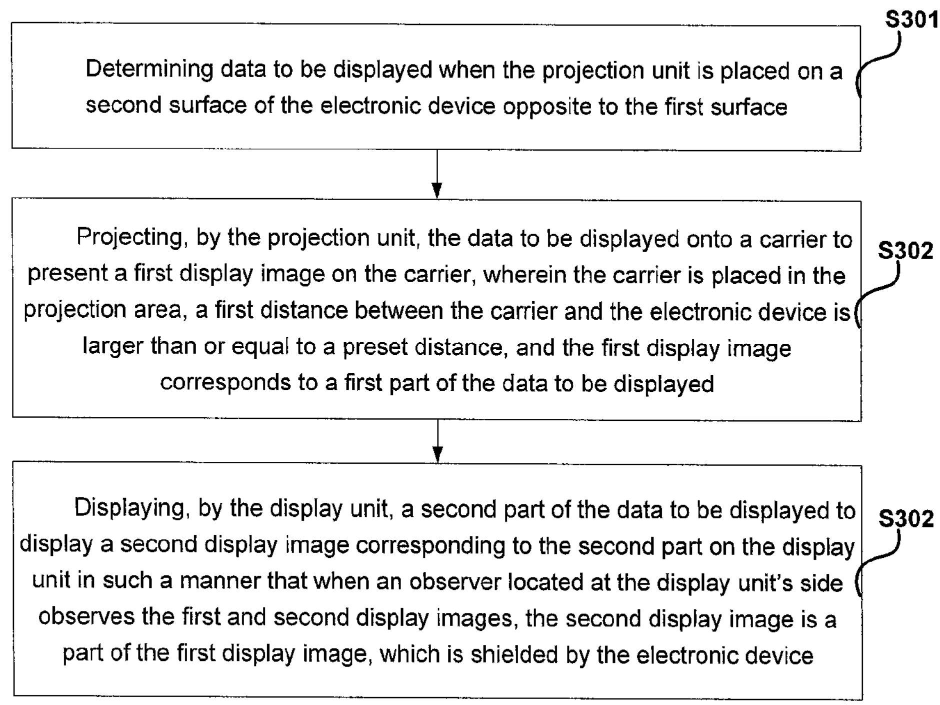
FIG. 3 is a flowchart of an image displaying method according to an embodiment of the present disclosure.

An image displaying method, as shown in FIGS. 1 and 2, are applied in an electronic device 10. In an implementation, the electronic device 10 may be a smart phone, a tablet computer, etc, and the present disclosure is not limited thereto. The electronic device 10 includes a display unit 101 and a projection unit 102 having a projection area. The display unit 101 is placed on a first surface (i.e., the front) of the electronic device 10. The projection unit 102 may be fixedly placed on a second surface (i.e., the back) of the electronic device 10, which is opposite to the first surface. Alternatively, the projection unit 102 may be a freely rotatable device, which may be rotatably placed either on the first surface or on the second surface. As shown in FIG. 3, the method may include steps S301, S302 and S303.

At step S301, data to be displayed is determined when the projection unit is placed on the second surface of the electronic device opposite to the first surface.

Figure 4:
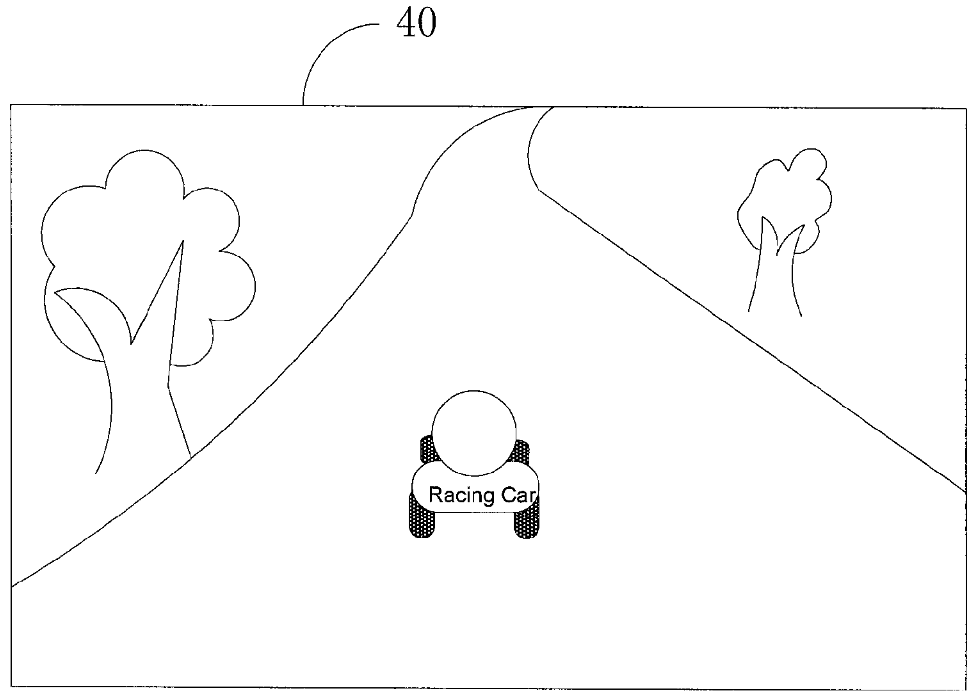
FIG. 4 is a schematic diagram of data to be displayed according to an embodiment of the present disclosure.

In an implementation, as shown in FIG. 4, data to be displayed 40 may be a picture, a frame of image, a scenario/interface image of an application, such as a frame of image of dynamic images in a racing game. These are not limiting.

Figure 5:
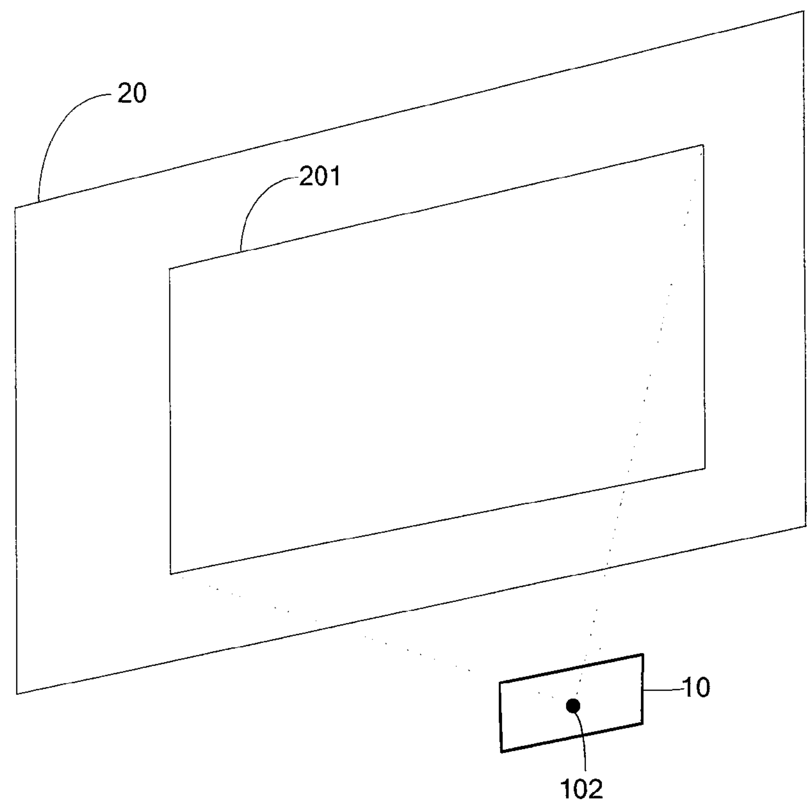
FIG. 5 is a schematic diagram of a scenario where a projection unit of an electronic device performs a projection in a first projection direction according to an embodiment of the present disclosure.

At step S302, as shown in FIG. 5, the data to be displayed 40 is projected by the projection unit 102 onto a carrier 20 to present a first display image on the carrier 20. The carrier 20 is placed in the projection area and the first display image at least corresponds to a first part of the data to be displayed 40.

In an implementation, the carrier 20 may be a wall, a blackboard/whiteboard (for use in presentation), or a projection curtain, etc. The carrier 20 should have a plane for clearly presenting the first display image.

Figure 6:
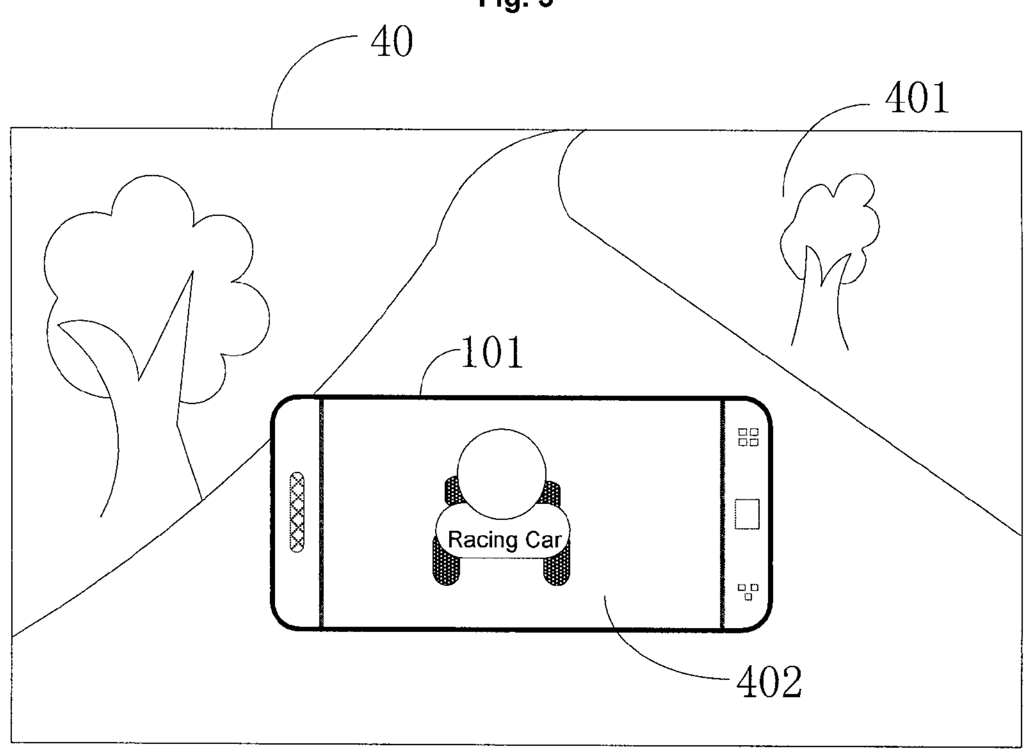
FIG. 6 is a schematic diagram of a first display image and a second display image when a current included angle between a preset edge of an electronic device and the horizontal direction is 0 degree, i.e., the preset edge of the electronic device is in a horizontal situation, according to an embodiment of the present disclosure.

In an implementation, as shown in FIG. 6, the first part (i.e., a first display image 401) may be either a part of the data to be displayed 40 (i.e., a part left after removing the data to be displayed 40), or an entirety of the data to be displayed 40.

At step S303, a second part of the data to be displayed 40 is displayed by the display unit 101, to display on the display unit 101 a second display image 402 corresponding to the second part in such a manner that when an observer located at the display unit 101 side observes the first display image 401 and the second display image 402, the second display image 402 is a part of the first display image 401, which is shielded by the electronic device 10.

According to the embodiment of the present disclosure, the display unit 101 of the electronic device 10 is used to display the second display image. The second display image is a part of the first display image 401, which is shielded by the electronic device 10 when the user watches over the electronic device 10 the first display image 401 projected onto the carrier 20. The user may watch the first display image 401 through the carrier 20 and watch the second display image 402 through the display unit 101. The first display image 401 and the second display image 402 form an entirety of the data to be displayed 40. In this case, the user may obtain the data to be displayed 40, which is completely displayed, by using the carrier 20 and the display unit 101. This may bring new visual experiences. For example, when the user is playing, for example, a racing game as shown in FIG. 6, the second display image 402 may only contain a racing car, and the first display image 401 shows a road condition for the racing car. At this time, the user may manipulate the game as really driving in the racing car, and obtain the road condition for the racing car and its surroundings from the first display image 401. Thereby, the user may obtain more realistic game experiences and visual enjoyment.

In an implementation, the second display image 402 may be a part of the first display image 401 (or the data to be displayed 40), which is shielded by the electronic device 10, when an observer located at the display unit 101 side observes the first display image 401 and the second display image 402. For example, as shown in FIG. 6, the second display image 402 is an image containing a racing car and a part of course. This image belongs to the first display image 401, however, due to being shielded by the electronic device 10, cannot be seen by the user directly facing the display unit 101. As another example, the second display image 402 may be an image containing a tree and a part of course.

The present disclosure further provides the following implementations based on the above image displaying method. Any of the following implementations may be combined.

A First Implementation

As shown in FIG. 5, a first distance between the carrier 20 and the projection unit 102 is larger than or equal to a preset distance, so that a carrying area on the carrier 20 for presenting the first display image is larger than a display area of the display unit.

Typically, the existing smart phone could only use its own display unit for displaying an image. However, as a size of such a display unit is small, it is impossible to clearly display an image, thereby easily resulting in visual fatigue for the user watching a small-size screen for long time.

In this implementation, the projection unit 102 is used to project the data to be displayed onto the carrier 20, such as onto a wall or a projection curtain. Moreover, the carrying area on the carrier 20 for presenting the first display image is larger than the display area of the display unit. This may form on the carrier 20 a large-size display image for the data to be displayed 40, thereby solving the technical problems occurring in a small-screen phone.

A Second Implementation

Figure 7:
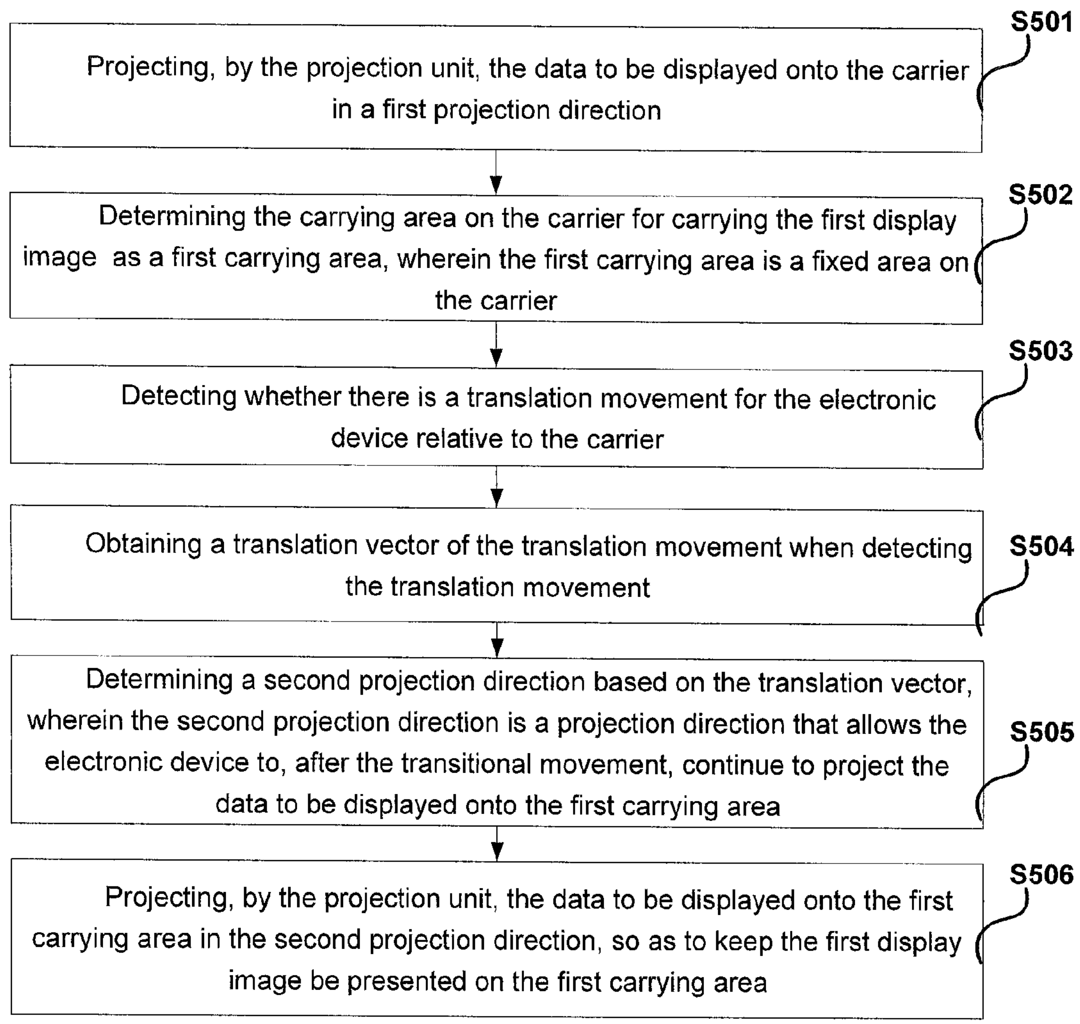
FIG. 7 is a first refined flowchart of step S302 according to an embodiment of the present disclosure.

As shown in FIG. 7, step S302 may include steps S501-S506.

At step S501, as shown in FIG. 5, the data to be displayed 40 is projected by the projection unit 102 onto the carrier 20 in a first projection direction.

At step S502, the carrying area on the carrier 20 for carrying the first display image 401 is determined as a first carrying area 201. The first carrying area 201 may be a fixed area on the carrier 20.

At step S503, it is detected whether there is a translation movement for the electronic device 10 relative to the carrier 20.

At step S504, a translation vector of the translation movement is obtained when the translation movement is detected. As an example, an image collecting device such as a camera may be installed on the first surface (or the second surface) of the electronic device 10. The camera collects an image directly facing the front of the display unit 101. If there is a translation movement for the electronic device 10 relative to the first carrying area 201, the image collected by the image collecting device may change. For example, the scenery in the image moves towards the lower left. The electronic device 10 may obtain a translation vector of the translation movement based on a change rule of the image.

At step S505, a second projection direction is determined based on the translation vector. The second projection direction is a projection direction that allows the electronic device 10 to, after the translation movement, project the data to be displayed 40 onto the first carrying area 201.

Figure 8:
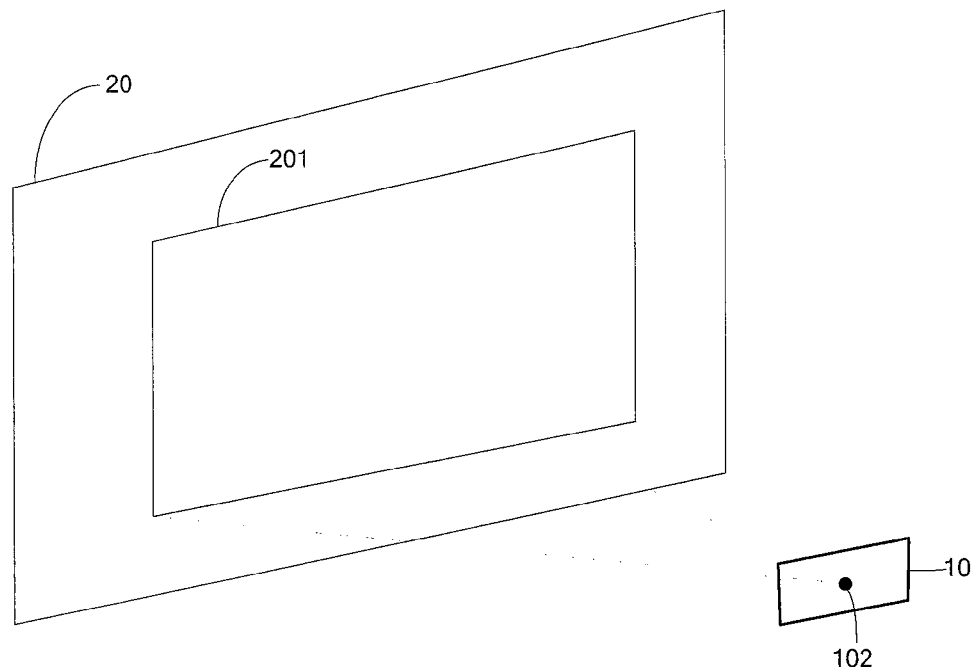
FIG. 8 is a schematic diagram of a scenario where a projection unit of an electronic device performs a projection in a second projection direction according to an embodiment of the present disclosure.

At step S506, as shown in FIG. 8, the data to be displayed 40 is projected by the projection unit 102 onto the first carrying area 201 in the second projection direction, so as to keep the first display image 401 be presented on the first carrying area 201.

In this implementation, no matter how the electronic device 10 translates, it is possible to present the first display image 401 on the first carrying area 201 of the carrier 20. In this way, when a size of the carrier 20 is small, it is possible to continuously project the first display image 401 onto the first carrying area 201. Meanwhile, this may further eliminate jitters of the translation movement of the first display image 401 when the electronic device 10 is held in hand, so that the observer watching the first display image 401 can watch the first display image 401 in a stable state without jitters.

A Third Implementation

Figure 10:
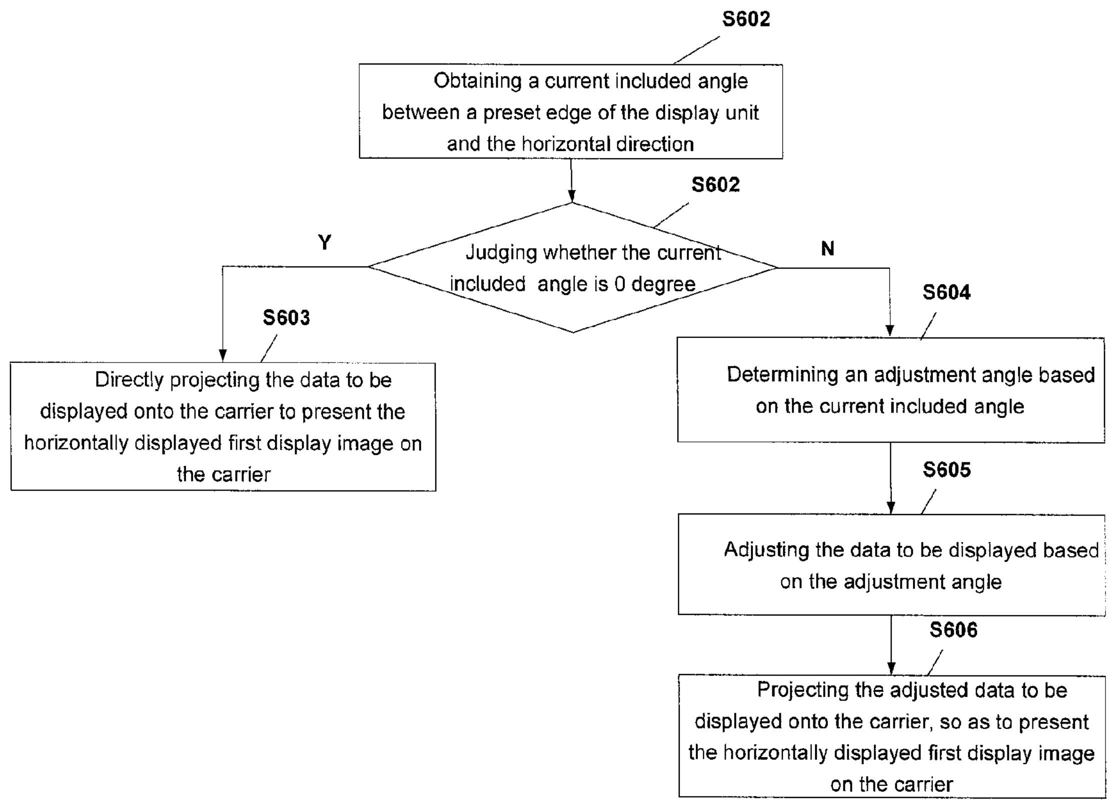
FIG. 10 is a second refined flowchart of step S302 according to an embodiment of the present disclosure.

As shown in FIG. 10, step S302 may include steps S601-S606.

At step S601, a current included angle between a preset edge 1001 of the display unit 101 and the horizontal direction is obtained. For example, the current included angle may be obtained by using a gravity sensor, a gyroscope, etc.

At step S602, it is judged whether the current included angle is 0 degree. That is, it is judged whether the preset edge 1001 is in a horizontal situation.

At step S603, as shown in FIG. 6, when the current included angle is 0 degree, the data to be displayed 40 is directly projected onto the carrier 20 to present the horizontally displayed first display image 401 on the carrier 20.

Figure 9:
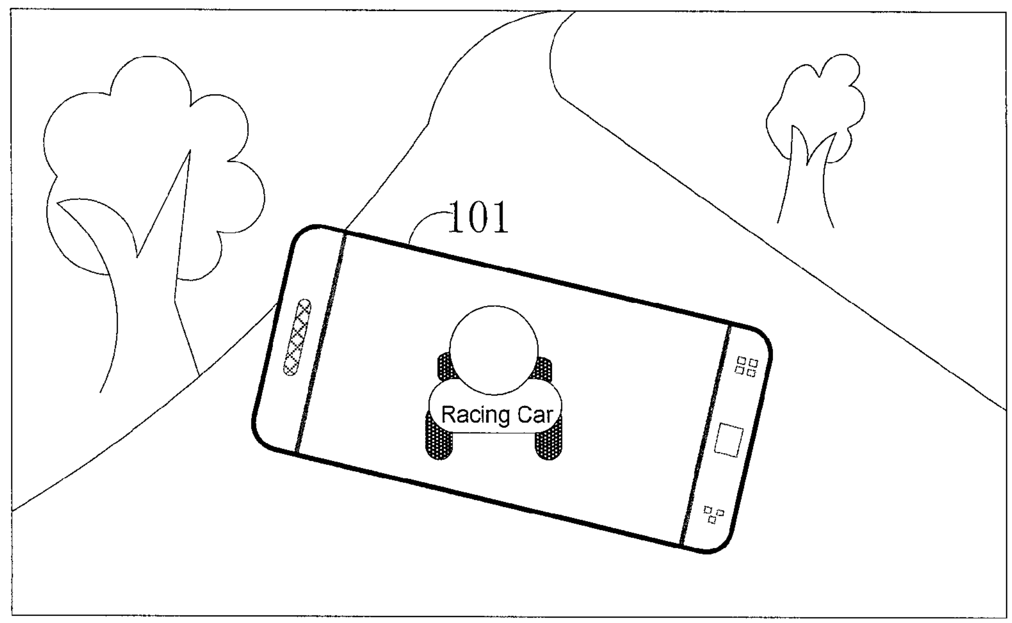
FIG. 9 is a schematic diagram of a first display image and a second display image when a current included angle between a preset edge of an electronic device and the horizontal direction is not 0 degree, i.e., the preset edge of the electronic device is not in a horizontal situation, according to an embodiment of the present disclosure.

At step S604, as shown in FIG. 9, when the current included angle is not 0 degree, an adjustment angle is determined based on the current included angle. For example, when the current included angle is 20 degree clockwise, the adjustment angle should be 20 degree anticlockwise.

At step S605, the data to be displayed 40 may be correspondingly adjusted based on the adjustment angle. For example, the data to be displayed 40 may be rotated by 20 degree anticlockwise.

At step S606, the adjusted data to be displayed 40 is projected onto the carrier 20, so as to present the horizontally displayed first display image 401 on the carrier 20.

In this implementation, no matter how the electronic device 10 swings to right and left (e.g., rotating clockwise or rotating anticlockwise), the first display image 401 projected onto the carrier 20 may still keeps in a horizontal situation. In this way, when the electronic device is held in hand, this may protect the first display image 401 from rotating clockwise or anticlockwise due to hand shakes. Thereby, this allows the observer to watch the first display image 401 in a clear, stable, and non-shaky manner.

A Fourth Implementation

Figure 11:
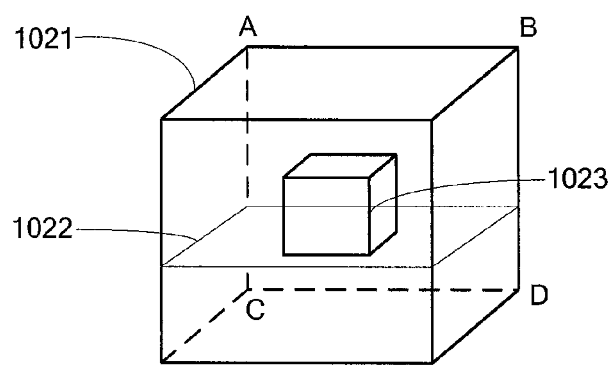
FIG. 11 is a structure diagram of a projection unit according to an embodiment of the present disclosure.

As shown in FIG. 11, the projection unit 102 may include a case 1021 and a projection module 1023.

The case 1021 is in a sealed state. An accommodation cavity is formed inside the case 1021. A preset dose of liquid 1022, e.g., water, oil, fine sand, mercury, etc., is held in the accommodation cavity. A transmittance of a first face (A, B, C or D) of the case 1021 meets a preset condition, i.e., with good transmittance.

The projection module 1023 is placed in the accommodation cavity, and is capable of floating on the liquid 1022, that is, an average density of the projection module 1023 is smaller than that of the fluid 1022. Moreover, the projection module 1023 is capable of connected to the electronic device 10 in a wired or wireless manner and projecting the data to be displayed 40 onto the carrier 20 though the first face (A, B, C, or D) of the case.

Figure 12:
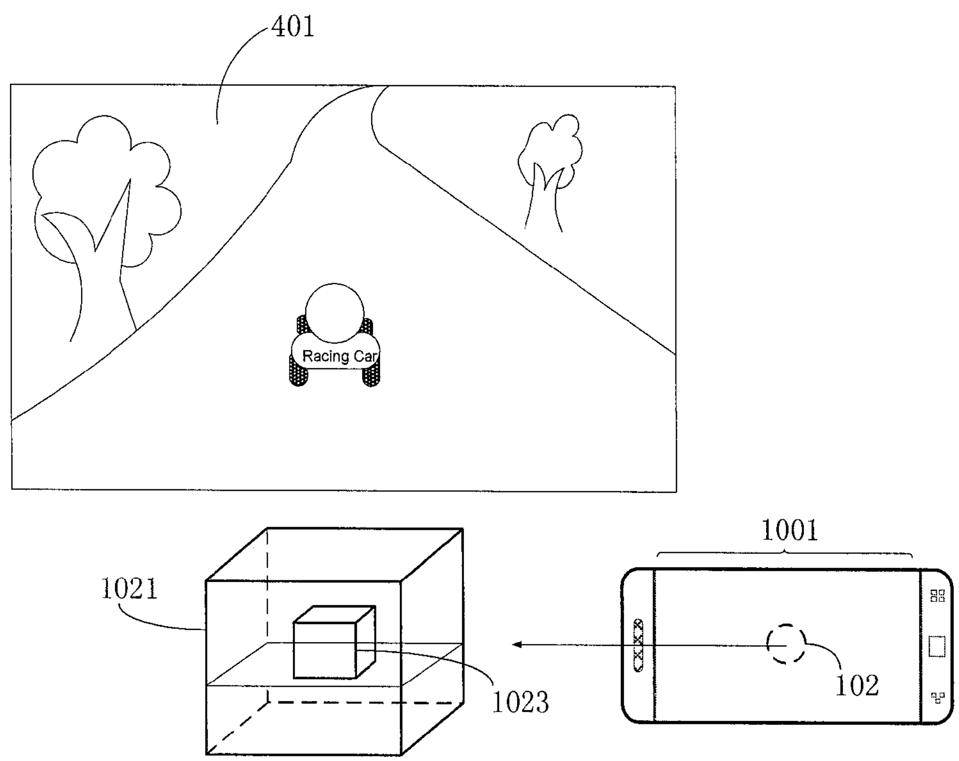
FIG. 12 is a schematic diagram of a scenario where a projection unit is used to perform a projection to form a first display image when a current included angle between a preset edge of an electronic device and the horizontal direction is 0 degree, i.e., the preset edge of the electronic device is in a horizontal situation, according to an embodiment of the present disclosure.
Figure 13:
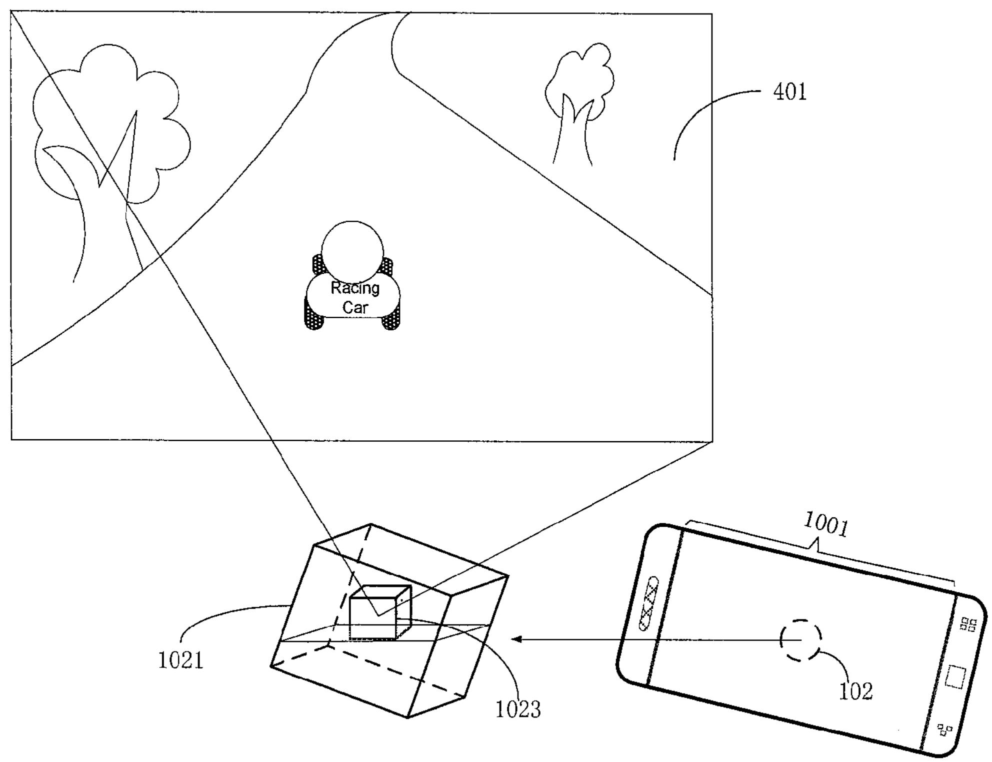
FIG. 13 is a schematic diagram of a scenario where a projection unit is used to perform a projection to form a first display image when a current included angle between a preset edge of an electronic device and the horizontal direction is not 0 degree, i.e., the preset edge of the electronic device is not in a horizontal situation, according to an embodiment of the present disclosure.

As shown in FIG. 12, when the current included angle between a preset edge of the display unit 101 and the horizontal direction is 0 degree, the projection module 1023 may present the horizontally displayed first display image 401 on the carrier 20. As shown in FIG. 13, when the current included angle is not 0 degree, the projection module 1023 may still preset the horizontally displayed first display image 401 on the carrier 20.

In this implementation, no matter how the case 1021 swings clockwise or anticlockwise following the electronic device 10, the projection module 1023 keeps in the horizontal situation under the action of the fluid 1022, thereby always presenting the horizontally displayed first display image on the carrier 20.

In this implementation, no manner whether the electronic device 10 is in a horizontal situation, it is possible to present the horizontally displayed first display image 401 on the carrier 20. In this way, when the electronic device is held in hand, this may protect the first display image 401 from rotating clockwise or anticlockwise due to hand shakes. Thereby, this allows the observer to watch the first display image 401 in a clear, stable, and non-shaky manner.

A Fifth Implementation

Figure 14:
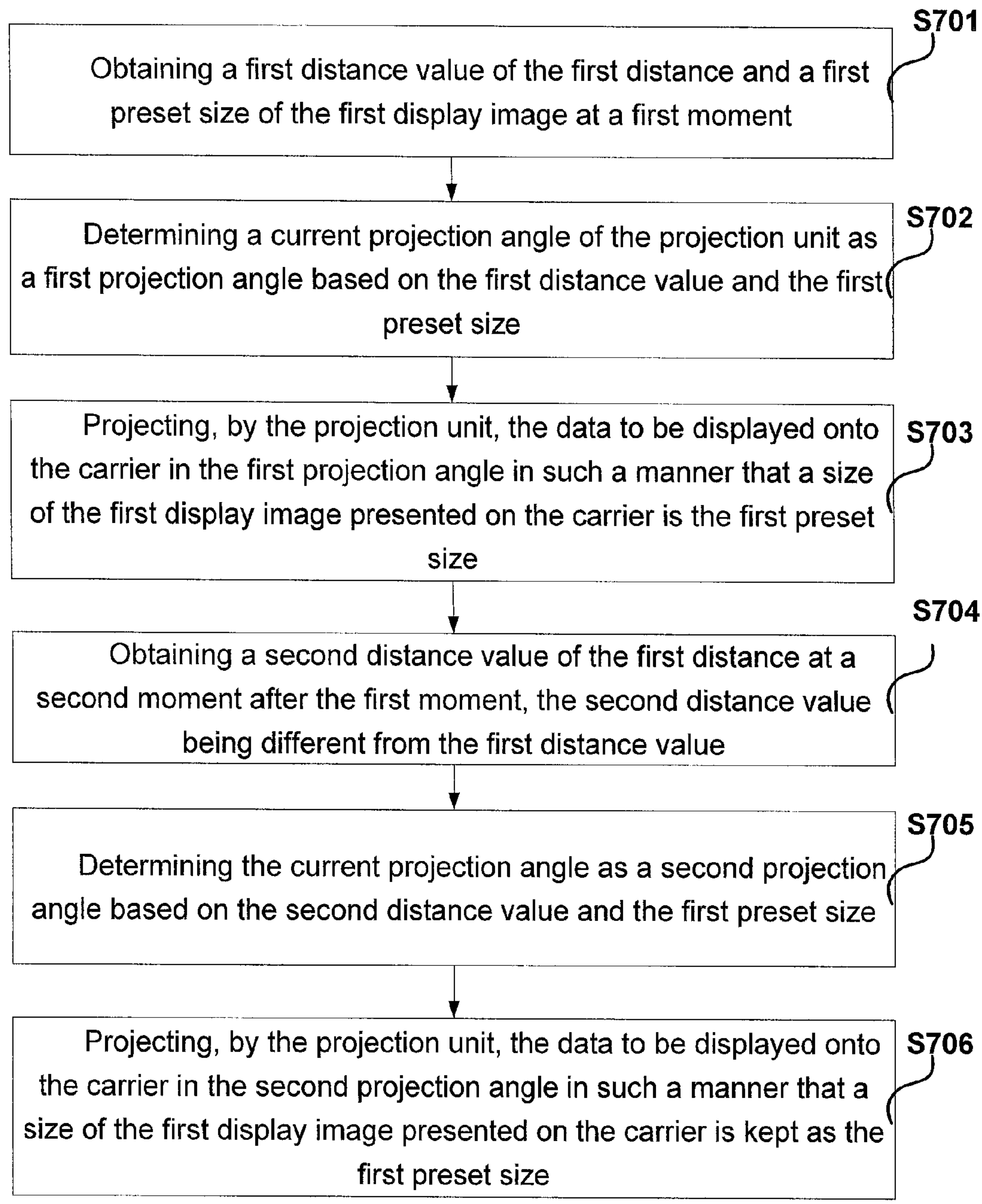
FIG. 14 is a third refined flowchart of step S302 according to an embodiment of the present disclosure.

As shown in FIG. 14, step S302 may include steps S701-S706.

Figure 17:
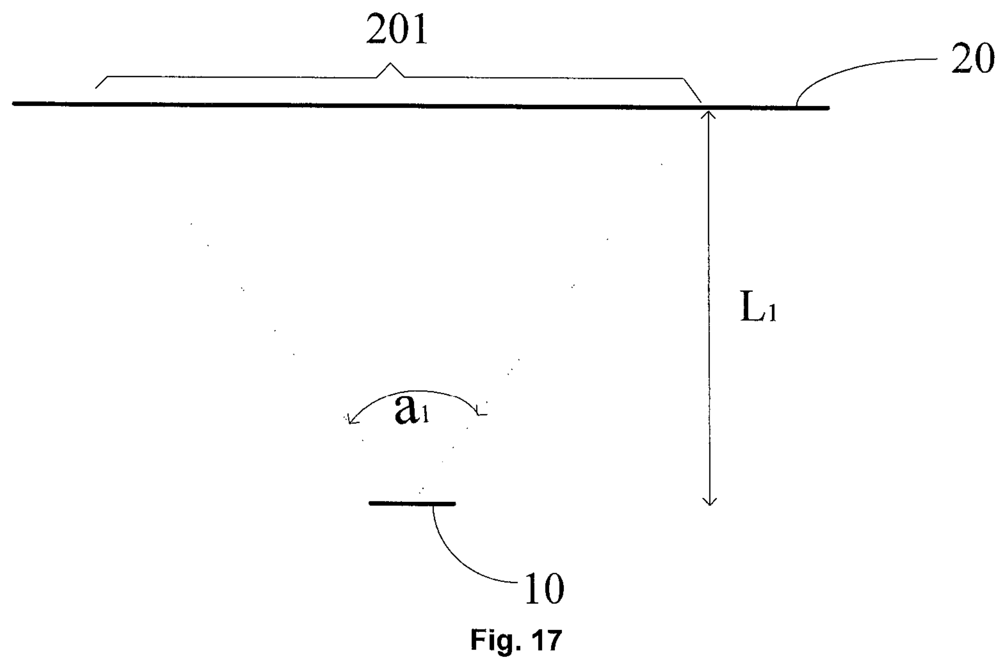
FIG. 17 is a schematic diagram of a projection unit performs a projection in a first projection angle according to an embodiment of the present disclosure.

At step S701, as shown in FIG. 17, a first distance value L1 of the first distance and a first preset size of the first display image is obtained at a first moment.

For example, the first distance value L1 may be obtained by means of a distance measuring device, such as an infrared distance measuring device or a ultrasonic distance measuring device. The first preset size may be either entered by the user, or selected by the user from server selectable sizes provided by the electronic device.

At step S702, a current projection angle of the projection unit is determined as a first projection angle a1 based on the first distance value L1 and the first preset size.

For example, the first projection angle a1 may be obtained based on the following equation:

$$\alpha = \frac{K_1 \cdot S}{L} + K_2,$$

wherein a is a current projection angle, S is a first preset size, L is a first distance, $K_1$ and $K_2$ are correction coefficients, and S, $K_1$ and $K_2$ are constants.

At step S703, the data to be displayed 40 is projected by the projection unit 102 onto the carrier 20 in the first projection angle a1 in such a manner that a size of the first display image 401 presented on the carrier 20 is the first preset size.

Figure 18:
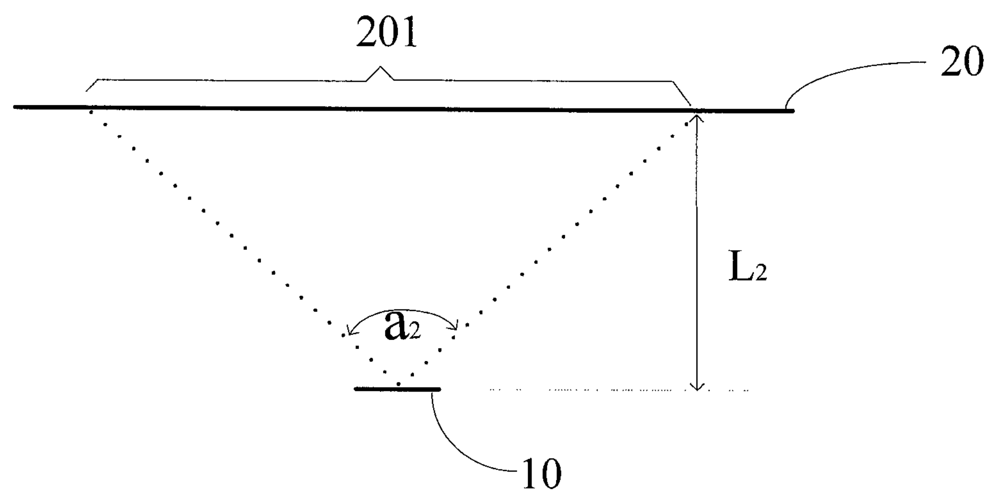
FIG. 18 is a schematic diagram of a projection unit performs a projection in a second projection angle according to an embodiment of the present disclosure.

At step S704, as shown in FIG. 18, a second distance value L2 of the first distance is obtained at a second moment after the first moment. The second distance value L2 is different from the first distance value L1

At step 705, the current projection angle is determined as a second projection angle a2 based on the second distance value L2 and the first preset size.

For example, the second projection angle a2 may be obtained based on the following equation:

$$\alpha = \frac{K_1 \cdot S}{L} + K_2,$$

wherein a is a current projection angle, S is a first preset size, L is a first distance, $K_1$ and $K_2$ are correction coefficients, and S, $K_1$ and $K_2$ are constants.

At step S706, the data to be displayed 40 is projected by the projection unit 102 onto the carrier 20 in the second projection angle a2 in such a manner that a size of the first display image 401 presented on the carrier 20 is kept as the first preset size.

In this implementation, no manner how the first distance between the projection unit 102 and the carrier 20 changes, the electronic device may present on the carrier 20 the first display image 401 meeting the first preset size. In this way, when the electronic device is held in hand, it is possible to protect the size of the first display image 401 from becoming unstable due to hand shakes. Thereby, this allows the observer to watch the first display image 401 in a clear and stable manner.

A Sixth Implementation

Figure 15:
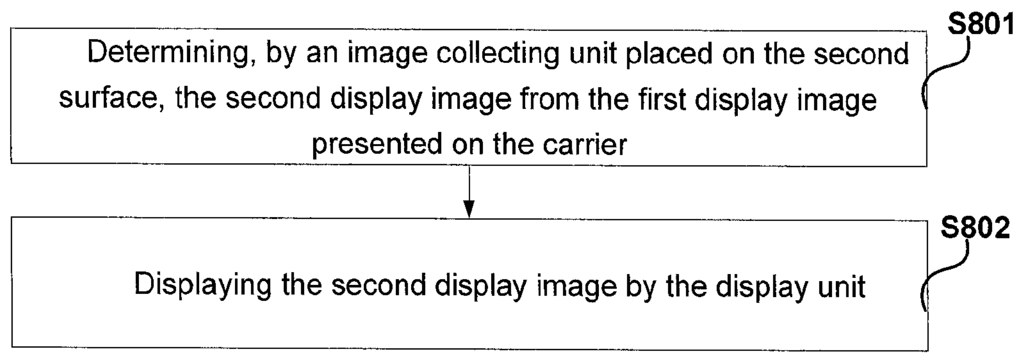
FIG. 15 is a refined flowchart of step S303 according to an embodiment of the present disclosure.

As shown in FIG. 15, step S303 may include steps S801 and S802.

At step S801, the second display image 402 is determined, by an image collecting unit 104 (e.g., a camera) placed on the second surface, from the first display image 401 presented on the carrier 20 (at this moment, the first display image 401 is the data to be displayed 40).

At step S802, the second display image 402 is displayed by the display unit 101.

Figure 16:
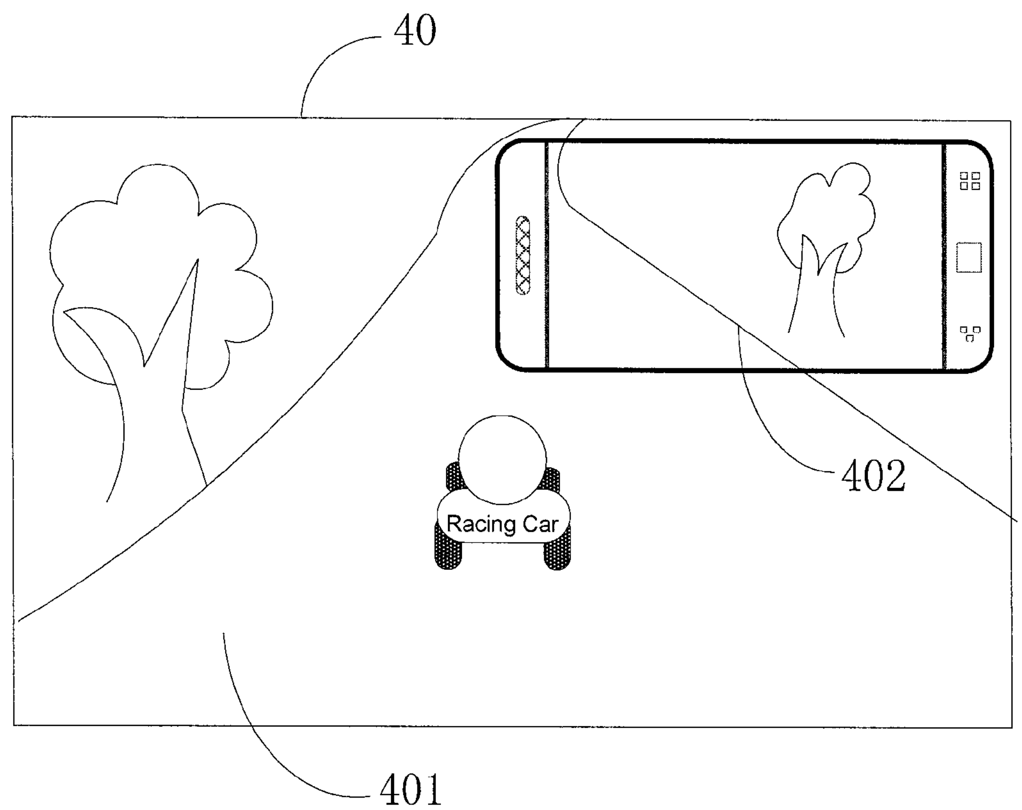
FIG. 16 is a schematic diagram of a first display image and a second display image after a translation movement of an electronic device relative to a first carrying area according to an embodiment of the present disclosure.

In this implementation, as shown in FIGS. 6, 9, and 16, the second display image 402 directly facing the second surface of the electronic device is obtained by the image collecting unit 104 and then is displayed by the display unit 101.

A Seventh Implementation

Before step S301, this implementation may further include the following operations.

When the user starts an application, an interactive interface is provided to the user by the display unit 101, such as a capacitive/resistive touch screen. On the interactive interface, there is information presented for asking whether the user is to initiate the image displaying method (its corresponding functions) or not. Moreover, the user's selection may be submitted via the interactive interface.

If the user chooses to initiate the image displaying method, step S301 is performed again to allow the electronic device to take related interface information of the application as the data to be displayed 40 and then apply the image displaying method according to the embodiments of the present disclosure in displaying the data.

One or more technical solutions according to embodiments of the present disclosure have at least technical effects as follows.

1. The embodiments of the present disclosure may use the projection unit to project data to be displayed onto the carrier, such as a wall or a projection curtain. Moreover, the carrying area on the carrier for displaying the first display image is larger than the display area of the display unit. This may obtain on the carrier a large-size display image for the data to be displayed, thereby solving the technical problem of the existing mobile phone that the data to be displayed cannot be clearly displayed, thereby easily resulting in visual fatigue for the user watching a small-size screen for long time. Then, the user may see an enlarged image of the data to be displayed on the carrier.

2. The use of the projection unit may enable the mobile phone to share the data to be displayed on the carrier, such as a wall or a projection curtain, for more users to watch the data to be displayed.

3. According to the embodiments of the present disclosure, the display unit of the electronic device is used to display the second display image. The second display image is a part of the first display image, which is shielded by the electronic device when the user watches over the electronic device the first display image projected onto the carrier. Thereby, the user may obtain more realistic game experiences and visual enjoyment. For example, when the user is playing, for example, a racing game as shown in FIG. 6, the second display image may only contain a racing car. At this time, the user may manipulate the game as really driving in the racing car, and obtain the road condition for the racing car and its surroundings from the first display image 401. Thereby, the user may obtain more realistic game experiences and visual enjoyment.

4. According to the embodiments of the present disclosure, when the projection unit performs a projection, if there is a translation movement for the electronic device relative to the carrier, the projection unit may make a corresponding adjustment to keep the first display image be presented on the same carrier area of the carrier. This may present the first display image on the first carrying area of the carrier no matter how the electronic device translates. In this way, when a size of the carrier is small, it is possible to continuously project the first display image onto the first carrying area. Meanwhile, this may further eliminate jitters of the translation movement of the first display image when the electronic device is held in hand, so that the observer watching the first display image can watch the first display image in a stable state without jitters.

5. According to the embodiments of the present disclosure, when the projection unit performs a projection, if the electronic devices swings clockwise or anticlockwise, the electronic device may make a corresponding adjustment to keep the horizontally displayed first display image be presented on the carrier. Thus, this may achieve the technical effect that the first display image projected onto the carrier may always keep in a horizontal situation no matter how the electronic device swings. In this way, when the electronic device is held in hand, this may protect the first display image from rotating clockwise or anticlockwise due to hand shakes. Thereby, this allows the observer to watch the first display image in a clear, stable, and non-shaky manner.

6. According to the embodiments of the present disclosure, a size of the first display image may be freely set. Moreover, the electronic device may adjust a projection angle of a projection unit in real time based on the user setting and depending on a distance between the electronic device and the carrier. This may project from the size of the first display image from changing due to swinging of the electronic device when it is held by the user. Thereby, the present disclosure may achieve a technical effect of keeping the size of the first display image presented on the carrier unchanged.

Second Embodiment

This embodiment provides an electronic device for implementing the image displaying method according to the embodiments of the present disclosure.

Figure 19:
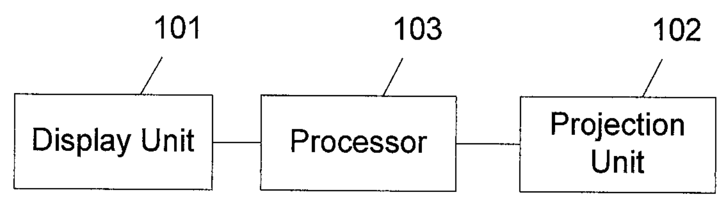
FIG. 19 is a schematic diagram of an electronic device according to an embodiment of the present disclosure.

As shown in FIG. 19, the electronic device may include:

- a display unit 101, such as a capacitive/resistive touch screen, placed on a first surface of the electronic device 10;
- a projection unit 102, such as a projector, placed on a second surface of the electronic device 10 and having a projection area, the first surface being opposite to the second surface; and
- a processor 103 connected to the display unit 101 and the projection unit 102.

The processor 103 may be configured to: determine data to be displayed 40 when the projection unit 102 is placed on the second surface of the electronic device 10 opposite to the first surface; project, by the projection unit 102, the data to be displayed 40 onto a carrier 20 to present a first display image 401 on the carrier 20, wherein the carrier 20 is placed in the projection area and the first display image 401 at least corresponds to a first part of the data to be displayed 40; displaying, by the display unit 101, a second part of the data to be displayed 40 to display a second display image 402 corresponding to the second part on the display unit 101 in such a manner that when an observer located at the display unit 101 side observes the first display image 401 and the second display image 402, the second display image 402 is a part of the first display image 401, which is shielded by the electronic device 10.

Preferably, a first distance between the carrier 20 and the projection unit 102 is larger than or equal to a preset distance, so that a carrying area on the carrier 20 for carrying the first display image 401 is larger than a display area of the display unit 101.

Preferably, the processor 102 may be further configured to: project, by the projection unit 102, the data to be displayed 40 onto the carrier 20 in a first projection direction; determine the carrying area on the carrier 20 for carrying the first display image 401 as a first carrying area 201, wherein the first carrying area 201 is a fixed area on the carrier 20; detect whether there is a translation movement for the electronic device 10 relative to the carrier 20; obtain a translation vector of the translation movement when detecting the translation movement; determine a second projection direction based on the translation vector, wherein the second projection direction is a projection direction that allows the electronic device 10 to, after the translation movement, project the data to be displayed 40 onto the first carrying area 201; and project, by the projection unit 102, the data to be displayed 40 onto the first carrying area 201 in the second projection direction, so as to keep the first display image 401 be presented on the first carrying area 201.

Preferably, the processor 103 may be further configured to: obtain a current included angle between a preset edge of the display unit 101 and the horizontal direction; judge whether the current included angle is 0 degree; when the current included angle is 0 degree, directly project the data to be displayed 40 onto the carrier 20 to present the horizontally displayed first display image 401 on the carrier 20.

Preferably, the processor 103 may be further configured to: when the current included angle is not 0 degree, determine an adjustment angle based on the current included angle; adjust the data to be displayed 40 based on the adjustment angle; and project the adjusted data to be displayed onto the carrier 20, so as to present the horizontally displayed first display image 401 on the carrier 20.

Preferably, the projection unit 102 may include a case 1021 and a projection module 1023.

The case 1021 is in a sealed state. An accommodation cavity is formed inside the case 1021. A preset dose of liquid 1022 is held in the accommodation cavity. A transmittance of a first face (A, B, C or D) of the case 1021 meets a preset condition.

The projection module 1023 is placed in the accommodation cavity. The projector 1023 is capable of floating on the liquid 1022. The projector 1023 is capable of projecting the data to be displayed 40 onto the carrier 20 though the first face (A, B, C, or D) of the case.

When the current included angle between the preset edge of the display unit and the horizontal direction is 0 degree, the projector 1023 is capable of presenting on the horizontally displayed first display image 401 the carrier 20. When the current included angle is not 0 degree, the projector 1023 is still capable of presenting the horizontally displayed first display image 401 on the carrier 20.

Preferably, the processor 103 may be further configured to: obtain a first distance value of the first distance and a first preset size of the first display image 401 at a first moment; determine a current projection angle of the projection unit 102 as a first projection angle based on the first distance value and the first preset size; project, by the projection unit 102, the data to be displayed 40 onto the carrier 20 in the first projection angle in such a manner that a size of the first display image 401 presented on the carrier 20 is the first preset size; obtain a second distance value of the first distance at a second moment after the first moment, the second distance value being different from the first distance value; determine the current projection angle as a second projection angle based on the second distance value and the first preset size; and project, by the projection unit 102, the data to be displayed 40 onto the carrier 20 in the second projection angle in such a manner that a size of the first display image 401 presented on the carrier 20 is kept as the first preset size.

Preferably, the electronic device 10 may further include an image collecting device 104 placed on the second surface and connected to the processor 103. In this case, the processor 103 may be further configured to: determine, by the image collecting device 104, the second display image 402 from the first display image 401 presented on the carrier 20; and display the second display image 402 by the display unit 101.

The electronic device as described in this embodiment is an electronic device for implementing the image displaying method according to the embodiments of the present disclosure. The operating procedures of the electronic device are identical with one or more embodiments of the method. Thus, details thereof will be omitted here.

The technical solution according to the second embodiment of the present disclosure has at least technical effects as follows.

The second embodiment of the present disclosure provides a projection unit. The projection unit includes a case and a projector. The case is in a sealed state. An accommodation cavity is formed inside the case. There is a preset dose of liquid held in the accommodation cavity. A transmittance of a first face of the case meets a preset condition. The projector is placed in the accommodation cavity and floats on the liquid. The projector is capable of projecting the data to be displayed onto the carrier though the first face of the case. With such a projection unit, when the current included angle between a preset edge of the display unit and the horizontal direction is 0 degree, the projector can present the horizontally displayed first display image on the carrier. When the current included angle between the preset edge of the display unit and the horizontal direction is not 0 degree, the projector can still present the horizontally displayed first display image on the carrier.

It will be appreciated that the embodiments of the present disclosure may be embodied as methods, systems or computer program products. Therefore, the present disclosure may be implemented in a form of pure hardware embodiments, pure software embodiments or embodiments incorporating software and hardware. Moreover, the present disclosure may be implemented in a form of a computer program product embodied on one or more computer readable storage medium (including, but not limited to, a magnetic disk storage, a CD-ROM, a optical storage, etc) containing computer readable program codes.

The present disclosure is described with reference to flowcharts and/or block diagrams of methods, devices (systems), and computer program products according to the embodiments of the present disclosure. It will be appreciated that each flow and/or block in the flowcharts and/or block diagrams and combinations thereof may be implemented by computer program instructions. The computer program instructions may be provided to a general purpose computer, a dedicated computer, an embedded processor or processors of other programmable data processing devices to form a machine, so that apparatus for implementing functions designated by one or more flows in a flowchart and/or one or more blocks in a block diagram may be generated by means of instructions executed by the computer or processors of other programmable data processing devices.

The computer program instructions may be also stored in a computer readable storage, which can direct the computer or other programmable data processing devices to operate in a specific manner. To this end, instructions stored in the computer readable storage may produce article of manufacture including instructions means. The instructions means implement functions as specified in one or more flows in a flowchart and/or one or more blocks in a block diagram.

The computer program instructions may be also loaded into a computer or other programmable data processing devices, so as to execute a serial of operation steps on the computer or other programmable data processing devices to produce actions taken by the computer. To this end, instructions executed on the computer or other programmable devices may be provided to implement functions as specified in one or more flows in a flowchart and/or one or more blocks in a block diagram.

It will be appreciated by the person of skill in the art that various modifications may be made to the above described embodiments without departing from the scope of the present disclosure. Therefore, the scope of the present disclosure should be recited in the claims.

What is claimed is:

1. An image displaying method applied in an electronic device, the electronic device comprising a display unit and a projection unit having a projection area, the display unit being placed on a first surface of the electronic device, the method comprises:

determining data to be displayed when the projection unit is placed on a second surface of the electronic device opposite to the first surface;

projecting, by the projection unit, the data to be displayed onto a carrier to present a first display image on the carrier, wherein the carrier is placed in the projection area and the first display image at least corresponds to a first part of the data to be displayed;

displaying, by the display unit, a second part of the data to be displayed, to is display a second display image corresponding to the second part on the display unit in such a manner that when an observer located at the display unit side observes the first and second display images, the second display image is a part of the first display image, which is shielded by the electronic device;

wherein a first distance between the carrier and the projection unit is larger than or equal to a preset distance, so that a carrying area on the carrier for carrying the first display image is larger than a display area of the display unit;

wherein said projecting, by the projection unit, the data to be displayed on the carrier to present the first display image on the carrier comprises:

projecting, by the projection unit, the data to be displayed onto the carrier in a first projection direction:

determining the carrying area on the carrier for carrying the first display image as a first carrying area, wherein the first carrying area is a fixed area on the carrier;

detecting whether there is a translation movement for the electronic device relative to the carrier;

obtaining a translation vector of the translation movement when detecting the translation movement;

determining a second projection direction based on the translation vector, wherein the second projection direction is a projection direction that allows the electronic device to, after the translation movement, project the data to be displayed onto the first carrying area; and projecting, by the projection unit, the data to be displayed onto the first carrying area in the second projection direction, so as to keep the first display image be presented on the first carrying area.

2. The method according to claim 1, wherein, said displaying, by the display unit, the second part of the data to be displayed comprises:

determining, by an image collecting unit placed on the second surface, the second display image from the first display image presented on the carrier; and displaying the second display image by the display unit.

3. An image displaying method applied in an electronic device, the electronic device comprising a display unit and a projection unit having a projection area, the display unit being placed on a first surface of the electronic device, the method comprises:

determining data to be displayed when the projection unit is placed on a second surface of the electronic device opposite to the first surface;

projecting, by the projection unit, the data to be displayed onto a carrier to present a first display image on the carrier, wherein the carrier is placed in the projection area and the first display image at least corresponds to a first part of the data to be displayed;

displaying, by the display unit, a second part of the data to be displayed, to display a second display image corresponding to the second part on the display unit in such a manner that when an observer located at the display unit side observes the first and second display images, the second display image is a part of the first display image, which is shielded by the electronic device;

wherein a first distance between the carrier and the projection unit is larger than or equal to a preset distance, so that a carrying area on the carrier for carrying the first display image is larger than a display area of the display unit;

wherein, said projecting, by the projection unit, the data to be displayed onto the carrier to present the first display image on the carrier comprises:

obtaining a first distance value of the first distance and a first preset size of the first display image at a first moment;

determining a current projection angle of the projection unit as a first projection angle based on the first distance value and the first preset size;

projecting, by the projection unit, the data to be displayed onto the carrier in the first projection angle in such a manner that a size of the first display image presented on the carrier is the first preset size;

obtaining a second distance value of the first distance at a second moment after the first moment, the second distance value being different from the first distance value;

determining the current projection angle as a second projection angle based on the second distance value and the first preset size; and projecting, by the projection unit, the data to be displayed onto the carrier in the second projection angle in such a manner that a size of the first display image presented on the carrier is kept as the first preset size.

4. The method according to claim 3, wherein, said displaying, by the display unit, the second part of the data to be displayed comprises:

determining, by an image collecting unit placed on the second surface, the second display image from the first display image presented on the carrier; and displaying the second display image by the display unit.

5. An electronic device, comprising:

a display unit placed on a first surface of the electronic device;

a projection unit placed on a second surface of the electronic device and having a projection area, the first surface being opposite to the second surface;

a processor connected to the display unit and the projection unit, the processor being configured to:

determine data to be displayed when the projection unit is placed on a second surface of the electronic device opposite to the first surface;

project, by the projection unit, the data to be displayed onto a carrier to present a first display image on the carrier, wherein the carrier is placed in the projection area and the first display image at least corresponds to a first part of the data to be displayed;

displaying, by the display unit, a second part of the data to be displayed, to display a second display image corresponding to the second part on the display unit in such a manner that when an observer located at the display unit side observes the first and second display images, the second display image is a part of the first display image, which is shielded by the electronic device;

wherein a first distance between the carrier and the projection unit is larger than or equal to a preset distance, so that a carrying area on the carrier for carrying the first display image is larger than a display area of the display unit;

wherein, said processor is further configured to:

project, by the projection unit, the data to be displayed onto the carrier in a first projection direction;

determine the carrying area on the carrier for carrying the first display image as a first carrying area, wherein the first carrying area is a fixed area on the carrier;

detect whether there is a translation movement for the electronic device relative to the carrier;

obtain a translation vector of the translation movement when detecting the translation movement;

determine a second projection direction based on the translation vector, wherein the second projection direction is a projection direction that allows the electronic device to, after the translation movement, project the data to be displayed onto the first carrying area; and project, by the projection unit, the data to be displayed onto the first carrying area in the second projection direction, so as to keep the first display image be presented on the first carrying area.

6. The electronic device according to claim 5, wherein, said electronic device further comprises:

an image collecting device placed on the second surface and connected to the processor;

wherein said processor is further configured to:

determine, by the image collecting device, the second display image from the first display image presented on the carrier; and display the second display image by the display unit.

7. An electronic device, comprising:

a display unit placed on a first surface of the electronic device;

a projection unit placed on a second surface of the electronic device and having a projection area, the first surface being opposite to the second surface;

a processor connected to the display unit and the projection unit, the processor being configured to:

determine data to be displayed when the projection unit is placed on a second surface of the electronic device opposite to the first surface;

project, by the projection unit, the data to be displayed onto a carrier to present a first display image on the carrier, wherein the carrier is placed in the projection area and the first display image at least corresponds to a first part of the data to be displayed;

displaying, by the display unit, a second part of the data to be displayed, to display a second display image corresponding to the second part on the display unit in such a manner that when an observer located at the display unit side observes the first and second display images, the second display image is a part of the first display image, which is shielded by the electronic device;

wherein a first distance between the carrier and the projection unit is larger than or equal to a preset distance, so that a carrying area on the carrier for carrying the first display image is larger than a display area of the display unit;

wherein, said processor is further configured to:

obtain a first distance value of the first distance and a first preset size of the first display image at a first moment;

determine a current projection angle of the projection unit as a first projection angle based on the first distance value and the first preset size;

project, by the projection unit, the data to be displayed onto the carrier in the first projection angle in such a manner that a size of the first display image presented on the carrier is the first preset size;

obtain a second distance value of the first distance at a second moment after the first moment, the second distance value being different from the first distance value;

determine the current projection angle as a second projection angle based on the second distance value and the first preset size; and project, by the projection unit, the data to be displayed onto the carrier in the second projection angle in such a manner that a size of the first display image presented on the carrier is kept as the first preset size.

8. The electronic device according to claim 7, wherein, said electronic device further comprises:

an image collecting device placed on the second surface and connected to the processor;

wherein said processor is further configured to:

determine, by the image collecting device, the second display image from the first display image presented on the carrier; and display the second display image by the display unit.

* * * * *